(12) United States Patent
Kosugi (10) Patent No.: US 11,788,706 B2
(45) Date of Patent: Oct. 17, 2023

(54) VEHICLE LUMINAIRE AND VEHICLE LIGHTING TOOL

(71) Applicant: Toshiba Lighting & Technology Corporation, Yokosuka (JP)

(72) Inventor: Daisuke Kosugi, Ehime-ken (JP)

(73) Assignee: Toshiba Lighting & Technology Corporation, Yokosuka (JP)

( * ) Notice: Subject to any disclaimer, the term of this patent is extended or adjusted under 35 U.S.C. 154(b) by 0 days.

(21) Appl. No.: 17/166,614

(22) Filed: Feb. 3, 2021

(65) Prior Publication Data

US 2021/0315075 A1 Oct. 7, 2021

(30) Foreign Application Priority Data

Apr. 2, 2020 (JP) ................................. 2020-066582

(51) Int. Cl.
| | | |
|---|---|---|
| H05B 45/10 | (2020.01) | |
| B60Q 1/20 | (2006.01) | |
| F21S 45/10 | (2018.01) | |
| F21S 45/47 | (2018.01) | |
| H05B 45/18 | (2020.01) | |
| F21V 23/00 | (2015.01) | |
| B60Q 1/26 | (2006.01) | |
| B60Q 1/28 | (2006.01) | |
| B60Q 1/34 | (2006.01) | |
| B60Q 1/44 | (2006.01) | |

(52) U.S. Cl.
CPC ............... *F21S 45/10* (2018.01); *F21S 45/47* (2018.01); *F21V 23/005* (2013.01); *H05B 45/18* (2020.01); *B60Q 1/20* (2013.01); *B60Q 1/2607* (2013.01); *B60Q 1/28* (2013.01); *B60Q 1/34* (2013.01); *B60Q 1/44* (2013.01)

(58) Field of Classification Search
CPC ........ H05B 45/18; H05B 45/10; H05B 45/40; H05B 45/56; F21S 45/47; B06Q 1/20; B06Q 1/28; B06Q 1/34; B06Q 1/44
See application file for complete search history.

(56) References Cited

U.S. PATENT DOCUMENTS

| | | | | |
|---|---|---|---|---|
| 5,198,794 | A * | 3/1993 | Sato ....................... | H01C 17/24 338/195 |
| 8,779,685 | B2 * | 7/2014 | Wang ..................... | H05B 45/20 315/32 |
| 9,854,635 | B2 * | 12/2017 | Liu ......................... | H05B 45/18 |
| 2009/0051196 | A1 * | 2/2009 | Ishii ....................... | H05B 3/146 297/180.12 |
| 2012/0007505 | A1 * | 1/2012 | Hayashi ................. | F21S 41/155 315/77 |

(Continued)

FOREIGN PATENT DOCUMENTS

| | | |
|---|---|---|
| EP | 3177112 A1 | 6/2017 |
| EP | 3584497 A1 | 12/2019 |
| JP | 2000-278859 A | 10/2000 |

*Primary Examiner* — Tung X Le
(74) *Attorney, Agent, or Firm* — Banner & Witcoff, Ltd.

(57) ABSTRACT

A vehicle luminaire according to an exemplary embodiment includes: a socket; and a light-emitting module that is provided on one end side of the socket and includes at least one light-emitting element, a negative characteristic thermistor, and a positive characteristic thermistor. The light-emitting element, the negative characteristic thermistor, and the positive characteristic thermistor are connected in series.

16 Claims, 8 Drawing Sheets

(56) References Cited

U.S. PATENT DOCUMENTS

| | | | |
|---|---|---|---|
| 2014/0197735 A1* | 7/2014 | Kornitz | F21V 29/67 338/22 R |
| 2014/0300284 A1* | 10/2014 | Lee | H05B 45/325 315/186 |
| 2016/0212853 A1* | 7/2016 | Kang | F21S 43/14 |
| 2017/0164443 A1* | 6/2017 | Liu | H05B 45/56 |
| 2018/0073714 A1* | 3/2018 | Ozawa | F21S 43/14 |
| 2018/0242421 A1* | 8/2018 | Ohta | H05B 45/10 |
| 2019/0093850 A1* | 3/2019 | Tsuchiya | F21S 45/10 |
| 2020/0271308 A1* | 8/2020 | Yasutake | F21S 43/195 |
| 2021/0160988 A1* | 5/2021 | Jooss | H05B 45/48 |

* cited by examiner

VEHICLE LUMINAIRE AND VEHICLE LIGHTING TOOL

CROSS-REFERENCE TO RELATED APPLICATIONS

This application is based upon and claims the benefit of priority from Japanese Patent Application No. 2020-066582, filed on Apr. 2, 2020; the entire contents of which are incorporated herein by reference.

FIELD

Embodiments described herein relate generally to a vehicle luminaire and a vehicle lighting tool.

BACKGROUND

From the viewpoints of energy saving and a long operation lifespan, a vehicle luminaire equipped with a light-emitting diode are becoming widespread instead of a vehicle luminaire equipped with a filament.

When lighting the vehicle luminaire, a voltage is applied to the vehicle luminaire (light-emitting diode). When a voltage is applied to the light-emitting diode, a current flows to the light-emitting diode, light is emitted from the light-emitting diode, and heat is generated. Accordingly, a temperature of the light-emitting diode is raised due to the generated heat. In addition, in the case of the vehicle luminaire for automobiles, a high voltage may be applied to the light-emitting diode due to a fluctuation in an input voltage, or an environmental temperature may be high. In this case, when the temperature of the light-emitting diode becomes excessively high, there is a concern that a function of the light-emitting diode may deteriorate, the light-emitting diode may be broken, or the operation lifespan of the light-emitting diode may be shortened.

According to this, there is suggested a technology in which a circuit in which a resistor and a positive characteristic thermistor are connected in series, and a resistor are connected in parallel, and when the temperature of the light-emitting diode becomes excessively high, a current flowing to the circuit to which the positive characteristic thermistor is connected is cut off by the positive characteristic thermistor, and the current is allowed to flow to only the resistor that is connected in parallel. In this case, it is possible to protect the light-emitting diode. However, there is room for an improvement in suppression of a fluctuation of total luminous flux in accordance with a temperature variation.

Here, it is desired to develop a technology capable of protecting the light-emitting element and suppressing the fluctuation in the total luminous flux in accordance with the temperature variation.

DETAILED DESCRIPTION

A vehicle luminaire according to an exemplary embodiment includes: a socket; and a light-emitting module that is provided on one end side of the socket and includes at least one light-emitting element, a negative characteristic thermistor, and a positive characteristic thermistor. The light-emitting element, the negative characteristic thermistor, and the positive characteristic thermistor are connected in series.

Hereinafter, the exemplary embodiment will be described with reference to the accompanying drawings. Note that, in the drawings, the same reference numeral will be given to the same constituent element, and detailed description thereof will be appropriately omitted.

(Vehicle Luminaire)

A vehicle luminaire 1 according to this embodiment can be provided, for example, in an automobile, a railway vehicle, and the like. Examples of the vehicle luminaire 1 provided in the automobile include vehicle luminaires which can be used in a front combination light (for example, an appropriate combination of a daytime running lamp (DRL), a position lamp, a turn signal lamp, and the like), a rear combination light (for example, an appropriate combination of a stop lamp, a tail lamp, a turn signal lamp, a back lamp, a fog lamp, and the like), and the like. However, the use of the vehicle luminaire 1 is not limited to the examples.

Figure 1:
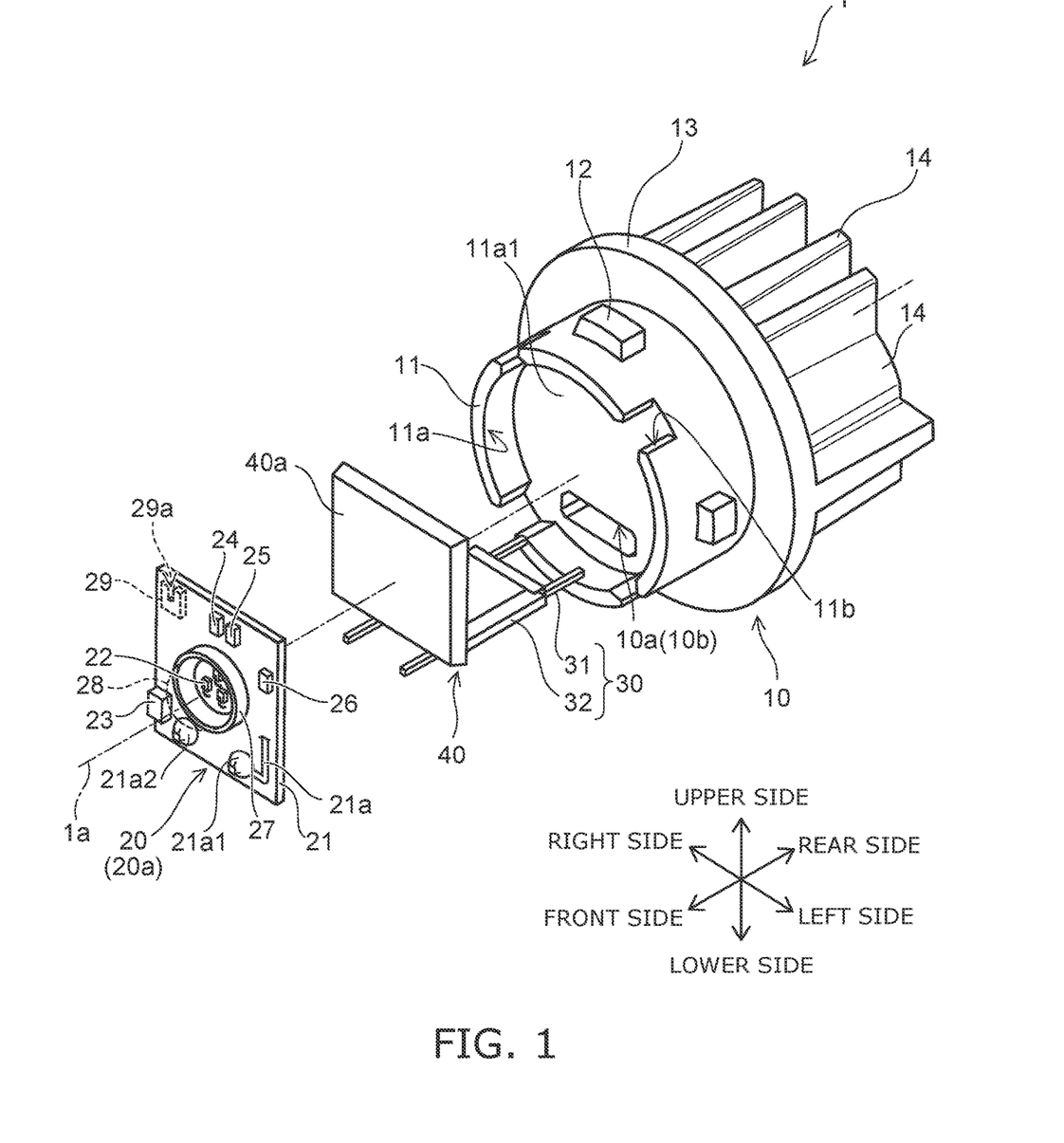
FIG. 1 is a schematic exploded view of a vehicle luminaire according to an exemplary embodiment.

FIG. 1 is a schematic exploded view of the vehicle luminaire 1 according to this embodiment.

Note that, when mounting the vehicle luminaire 1 to a housing 101 of a vehicle lighting tool 100, a direction that is a forward side of the vehicle lighting tool 100 is set as a front side, a direction that is a rearward side is set as a rear side, a direction that is an upward side is set as an upper side, a direction that is a downward side is set as a lower side, a direction that is a rightward side is set as a right side, and a direction that is a leftward side is set as a left side. In this case, a direction including the front side, the rear side, the right side, and the left side can be set as a horizontal direction, and a direction including the upper side and the lower side can be set a vertical direction.

Figure 2:
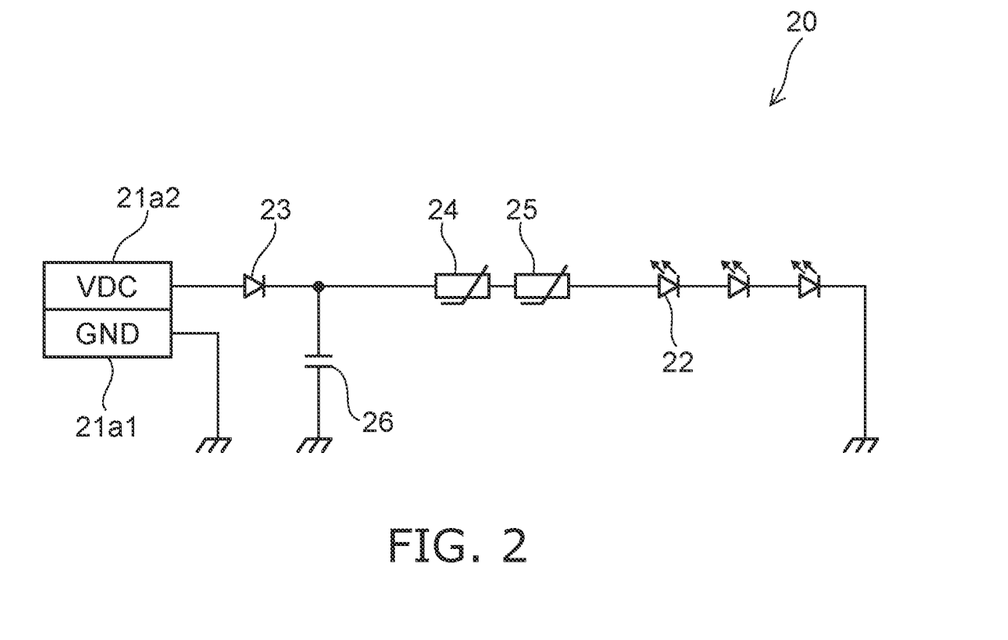
FIG. 2 is a circuit diagram of a light-emitting module.

FIG. 2 is a circuit diagram of a light-emitting module 20.

As illustrated in FIG. 1, a socket 10, the light-emitting module 20, a power-supply part 30, and a heat transfer part 40 can be provided in the vehicle luminaire 1.

The socket 10 can include a mounting part 11, a bayonet 12, a flange 13, and a thermal radiation fin 14.

The mounting part 11 can be provided on a surface of the flange 13 which is opposite to a surface on which the thermal radiation fin 14 is provided. An external shape of the mounting part 11 can be set as a columnar shape. For example, the external shape of the mounting part 11 is a circular column shape. The mounting part 11 can include a concave part 11a that is opened to an end on a side opposite to the flange 13 side.

At least one slit 11b can be provided in the mounting part 11. A corner portion of a board 21 can be provided inside the slit 11b. A dimension (width) of the slit 11b in a peripheral direction of the mounting part 11 can be set to be slightly larger than a dimension of the corner portion of the board 21. In this case, positioning of the board 21 can be carried out by inserting the corner portion of the board 21 into the slit 11b.

In addition, when the slit 11b is provided, a planar shape of the board 21 can be enlarged. According to this, the number of elements mounted on the board 21 can be increased. Alternatively, since the external size of the mounting part 11 can be reduced, a reduction in size of the mounting part 11, and a reduction in size of the vehicle luminaire 1 can be realized.

The bayonet 12 can be provided on an outer surface of the mounting part 11. For example, the bayonet 12 protrudes toward an outer side of the vehicle luminaire 1. The bayonet 12 can be set to face the flange 13. A plurality of the bayonets 12 can be provided. The bayonet 12 can be used when mounting the vehicle luminaire 1 to the housing 101 of the vehicle lighting tool 100. The bayonet 12 can be used for twist lock.

The flange 13 can be set to have a plate shape. For example, the flange 13 can be set to have a disk shape. An outer surface of the flange 13 can be located on an outer side of the vehicle luminaire 1 in comparison to an outer surface of the bayonet 12.

The thermal radiation fin 14 can be provided on a side of the flange 13 which is opposite to the mounting part 11 side. As the thermal radiation fin 14, at least one piece can be provided. For example, a plurality of the thermal radiation fins 14 are provided in the socket 10 illustrated in FIG. 1. The plurality of thermal radiation fins 14 can be provided in parallel in a predetermined direction. The thermal radiation fins 14 can be set to have a plate shape.

In addition, a hole 10a and a hole 10b can be provided in the socket 10. One end of the hole 10a is opened to a bottom surface 11a1 of the concave part 11a. A support part 32 can be provided inside the hole 10a. One end of the hole 10b is connected to the other end of the hole 10a. The other end of the hole 10b is opened to an end of the socket 10 on the thermal radiation fin 14 side. Ends of a plurality of power-supply terminals 31 are exposed to the inside of the hole 10b. A connector 105 including a sealing member 105a is inserted into the hole 10b, and the connector 105 can be fitted to the ends of the plurality of power-supply terminals 31.

The socket 10 can has a function of holding the light-emitting module 20 and the power-supply part 30, and a function of transferring heat generated in the light-emitting module 20 to the outside. Accordingly, it is preferable that the socket 10 is formed from a material such as a metal having high heat conductivity.

In addition, recently, it is desired for the socket 10 to efficiently radiate heat generated in the light-emitting module 20, and to be light in weight. Accordingly, it is more preferable that the socket 10 is formed from a highly heat conductive resin. For example, the highly heat conductive resin includes a resin and a filler using an inorganic material. For example, the highly heat conductive resin can be set as a material obtained by mixing a filler using carbon or aluminum oxide in a resin such as polyethylene terephthalate (PET) and nylon.

In the case of the socket 10 which contains the highly heat conductive resin, and in which the mounting part 11, the bayonet 12, the flange 13, and the thermal radiation fin 14 are integrally formed, heat generated in the light-emitting module 20 can be efficiently radiated. In addition, the weight of the socket 10 can be reduced. In this case, the mounting part 11, the bayonet 12, the flange 13, and the thermal radiation fin 14 can be integrally formed by using an injection molding method or the like. In addition, the socket 10 and the power-supply part 30 can also be integrally formed by using an insert molding method or the like.

The power-supply part 30 can include a plurality of the power-supply terminals 31 and the support part 32.

The plurality of power-supply terminals 31 can be set as a pin-shaped body. Ends of the plurality of power-supply terminals 31 on the light-emitting module 20 side can be soldered to an output terminal 21a1 and an input terminal 21a2 of a wiring pattern 21a. Ends of the plurality of power-supply terminals 31 on the thermal radiation fin 14 side can be exposed to the inside of the hole 10b. For example, the power-supply terminals 31 can be formed from a metal such as a copper alloy. Note that, the number, the shape, the arrangement, the material, and the like of the power-supply terminals 31 are not limited to the example, and can be appropriately changed.

As described above, it is preferable that socket 10 is formed from a material with high heat conductivity. By the way, the material with high heat conductivity may have electrical conductivity. For example, the highly heat conductive resin or the like which uses a filler containing carbon may have electrical conductivity. According to this, the support part 32 can be provided for insulation between the power-supply terminals 31 and the socket 10 having electrical conductivity. In addition, the support part 32 can also have a function of holding the plurality of power-supply terminals 31. Note that, when the socket 10 is formed from the highly heat conductive resin (for example, a highly heat conductive resin containing a filler using aluminum oxide, or the like) having insulation properties, the support part 32 can be omitted. In this case, the socket 10 can hold the plurality of power-supply terminals 31.

The support part 32 can be formed from a resin having insulation properties. For example, the support part 32 can be pressed into the hole 10a provided in the socket 10, or can be bonded to an inner wall of the hole 10a.

The heat transfer part 40 can be provided between the socket 10 and the light-emitting module 20. The heat transfer part 40 can be bonded to the bottom surface 11a1 of the concave part 11a. In this case, it is preferable to use adhesive with high heat conductivity as adhesive. For example, the adhesive can be set as adhesive in which a filler using an inorganic material is mixed in. In addition, the heat transfer part 40 can also be mounted to the bottom surface 11a1 of the concave part 11a through a layer including heat conductive grease (thermal radiation grease). As the heat conductive grease, for example, grease obtained by mixing a filler using an inorganic material in modified silicone can be used. In addition, the heat transfer part 40 can also be inserted into the bottom surface 11a1 of the concave part 11a by using an insert molding method or the like.

Note that, when heat generated in the light-emitting module 20 is less, the heat transfer part 40 can also be omitted. When the heat transfer part 40 is omitted, for example, the light-emitting module 20 can be bonded to the bottom surface 11a1 of the concave part 11a.

The light-emitting module 20 can be provided on one end side of the socket 10.

As illustrated in FIG. 1 and FIG. 2, the light-emitting module 20 can include the board 21, a light-emitting element 22, a diode 23, a negative characteristic thermistor 24, a positive characteristic thermistor 25, a capacitor 26, a frame part 27, and a sealing part 28. The elements can be electrically connected to the wiring pattern 21a provided on the board 21.

For example, the board 21 can be bonded to a surface 40a of the heat transfer part 40 on a side opposite to the bottom surface 11a1 side of the concave part 11a. As adhesive for bonding the board 21 to the heat transfer part 40, the same adhesive for bonding the heat transfer part 40 to the bottom surface 11a1 of the concave part 11a can be used. For example, the board 21 can be formed from an inorganic material such as ceramics (for example, aluminum oxide, aluminum nitride, and the like), an organic material such as paper phenol and glass epoxy, or the like. In addition, the board 21 may be a member obtained by coating a surface of a metal plate with an insulating material. When the amount of heat generation in the light-emitting element 22 is large, from the viewpoint of thermal radiation, it is preferable that the board 21 is formed by using a material with high heat conductivity. Examples of the material with high heat conductivity include ceramics such as aluminum oxide and aluminum nitride, a highly heat conductive resin, a member obtained by coating a surface of a metal plate with an insulating material, and the like. In addition, the board 21 may have a single-layer structure, or a multi-layer structure.

In addition, the wiring pattern 21a can be provided on the surface of the board 21. For example, the wiring pattern 21a can be formed from a material containing silver as a main component, a material containing copper as a main component, or the like.

The light-emitting element 22 can be provided on a side of the board 21 which is opposite to the heat transfer part 40 side. As the light-emitting element 22, at least one piece can be provided. In the case of the vehicle luminaire 1 illustrated in FIG. 1 and FIG. 2, a plurality of the light-emitting elements are provided. Note that, when the plurality of light-emitting elements 22 are provided, the plurality of the light-emitting elements 22 can be connected in series.

For example, each of the light-emitting elements 22 can be set as a light-emitting diode, an organic light-emitting diode, a laser diode, or the like.

For example, the light-emitting element 22 can be set as a chip-shaped light-emitting element, a surface mounting type light-emitting element, a shell type light-emitting element including a lead wire, or the like. However, the chip-shaped light-emitting element is preferable when considering a reduction in size of the light-emitting module 20, and a reduction in size of the vehicle luminaire 1. The chip-shaped light-emitting element 22 can be mounted by a Chip On Board (COB). For example, the chip-shaped light-emitting element 22 can be set as a vertical type light-emitting element, an upper type light emitting element, a flip chip type light-emitting element, or the like. The light-emitting element illustrated in FIG. 1 is the vertical type light-emitting element.

As illustrated in FIG. 2, the diode 23 can be electrically connected to between the light-emitting element 22 and the input terminal 21a2. The diode 23 can be provided so that a reverse voltage is not applied to the light-emitting element 22, and a pulse noise from the reverse direction is not applied to the light-emitting element 22. For example, the diode 23 can be set as a surface mounting type diode, a diode including a lead wire, or the like. The diode 23 illustrated in FIG. 1 is the surface mounting type diode.

In the negative characteristic thermistor 24, when a temperature rises, a resistance value gradually decreases. For example, the negative characteristic thermistor 24 can be electrically connected to between the light-emitting element 22 and the diode 23.

In the positive characteristic thermistor 25, when a temperature exceeds a Curie point, a resistance value rapidly increases. For example, the positive characteristic thermistor 25 can be electrically connected to between the light-emitting element 22 and the diode 23. As illustrated in FIG. 2, the positive characteristic thermistor 25 can be connected to the negative characteristic thermistor 24 in series. In addition, the negative characteristic thermistor 24, the positive characteristic thermistor 25, and the light-emitting element 22 can be connected in series. At this time, the negative characteristic thermistor 24 may be electrically connected to between the input terminal 21a2 and the positive characteristic thermistor 25, and the positive characteristic thermistor 25 may be electrically connected to between the input terminal 21a2 and the negative characteristic thermistor 24.

The negative characteristic thermistor 24, the positive characteristic thermistor 25, and the light-emitting element 22 are thermally connected through the board 21 or the wiring pattern 21a. Accordingly, when a temperature of the light-emitting element 22 rises, a temperature of the negative characteristic thermistor 24 rises, and a resistance value of the negative characteristic thermistor 24 decreases. In addition, a temperature of the positive characteristic thermistor 25 rises, and a resistance value of the positive characteristic thermistor 25 increases.

As to be described later, a variation in the resistance value of the positive characteristic thermistor 25 in accordance with the temperature variation can be used in temperature control (protection) of the light-emitting element 22. A variation in a combined resistance value between the negative characteristic thermistor 24 and the positive characteristic thermistor 25 in accordance with the temperature variation can be used in correction of temperature characteristics of the light-emitting element. Accordingly, it is preferable that heat generated in the light-emitting element 22 is easily transferred to the positive characteristic thermistor 25 and the negative characteristic thermistor 24. For example, when the positive characteristic thermistor 25 and the negative characteristic thermistor 24 are provided in the vicinity of the frame part 27, heat generated in the light-emitting element 22 is easily transferred to the positive characteristic thermistor 25 and the negative characteristic thermistor 24.

In addition, when mounting the vehicle luminaire 1 to the housing 101 of the vehicle lighting tool 100, as illustrated in FIG. 1, a central axis 1a of the vehicle luminaire 1 may be approximately horizontal. In this case, it is preferable that at least any one of the positive characteristic thermistor 25 and the negative characteristic thermistor 24 is located on an upward side in comparison to the central axis 1a. Generally, the light-emitting element 22 is provided in the vicinity of the central axis 1a of the vehicle luminaire 1. In addition, heat generated in the light-emitting element 22 is likely to propagate to an upward side.

For example, when the positive characteristic thermistor 25 is located in an upward side in comparison to the central axis 1a, heat generated in the light-emitting element 22 is easily transferred to the positive characteristic thermistor 25, and thus it is easy to suppress the temperature of the light-emitting element 22 from exceeding a maximum junction temperature. That is, it is easy to protect the light-emitting element 22.

For example, when the positive characteristic thermistor 25 and the negative characteristic thermistor 24 are located on an upward side in comparison to the central axis 1a, heat generated in the light-emitting element 22 is easily transferred to the positive characteristic thermistor 25 and the negative characteristic thermistor 24, and thus correction of the temperature characteristics of the light-emitting element becomes easy. That is, it is easy to suppress a fluctuation of total luminous flux in accordance with the temperature variation.

Since the negative characteristic thermistor 24, the positive characteristic thermistor 25, and the light-emitting element 22 are connected in series, a value of a current flowing to the light-emitting element 22 can be controlled by a combined resistance value of the negative characteristic thermistor 24 and the positive characteristic thermistor 25 (the sum of a resistance value of the negative characteristic thermistor 24 and a resistance value of the positive characteristic thermistor 25).

Note that, an operation and an effect relating to the serial connection of the negative characteristic thermistor 24, the positive characteristic thermistor 25, and the light-emitting element 22 will be described later.

For example, the capacitor 26 can be provided to make a countermeasure for noise or to smooth a voltage.

As illustrated in FIG. 1, the frame part 27 can be bonded onto the board 21. The frame part 27 can be set to have a frame shape. At least one piece of the light-emitting element 22 can be provided in a region surrounded by the frame part 27. For example, the frame part 27 can surround a plurality of the light-emitting elements 22.

Note that, description was given of a case where the frame part 27 is molded by using an injection molding method or the like, and the molded frame part 27 is bonded to the board 21, but there is no limitation to the case. For example, the frame part 27 can also be formed by applying a melted resin on the board 21 in a frame shape by using a dispenser or the like, and by curing the resin.

In addition, the frame part 27 can also have a function as a reflector that reflects light emitted from the light-emitting element 22.

Note that, the frame part 27 can also be omitted. When the frame part 27 is omitted, a dome-shaped sealing part 28 is formed on the board 21. However, when the frame part 27 is provided, a formation range of the sealing part 28 can be defined. Accordingly, it is possible to suppress a planar size of the sealing part 28 from increasing, and thus a reduction in size of the board 21, and a reduction in size of the vehicle luminaire 1 can be realized.

The sealing part 28 can be provided on an inner side of the frame part 27. The sealing part 28 can cover a region surrounded by the frame part 27. The sealing part 28 can cover the light-emitting element 22. The sealing part 28 can be formed from a material having translucency. For example, the sealing part 28 can be formed by filling a region surrounded by the frame part 27 with a resin. Filling with the resin can be performed, for example, by using a dispenser or the like. For example, the filling resin can be set as a silicone resin or the like. In addition, a phosphor can be contained in the sealing part 28. For example, the phosphor can be set as an yttrium-aluminum-garnet-based phosphor (YAG-based phosphor). However, the type of the phosphor can be appropriately changed so as to obtain a predetermined emission color in correspondence with the use of the vehicle luminaire 1 or the like.

Note that, when using the surface mounting type light-emitting element or the light-emitting element including a lead wire such as the shell type, the frame part 27 and the sealing part 28 can be omitted. However, as described above, it is preferable that the light-emitting element 22 is set as the chip-shaped light-emitting element, and the frame part 27 and the sealing part 28 are provided in consideration of a reduction in size of the board 21.

Next, description will be given of a configuration in which the negative characteristic thermistor 24, the positive characteristic thermistor 25, and the light-emitting element 22 are connected in series.

First, a light-emitting module 120 according to a comparative example will be described.

Figure 3:
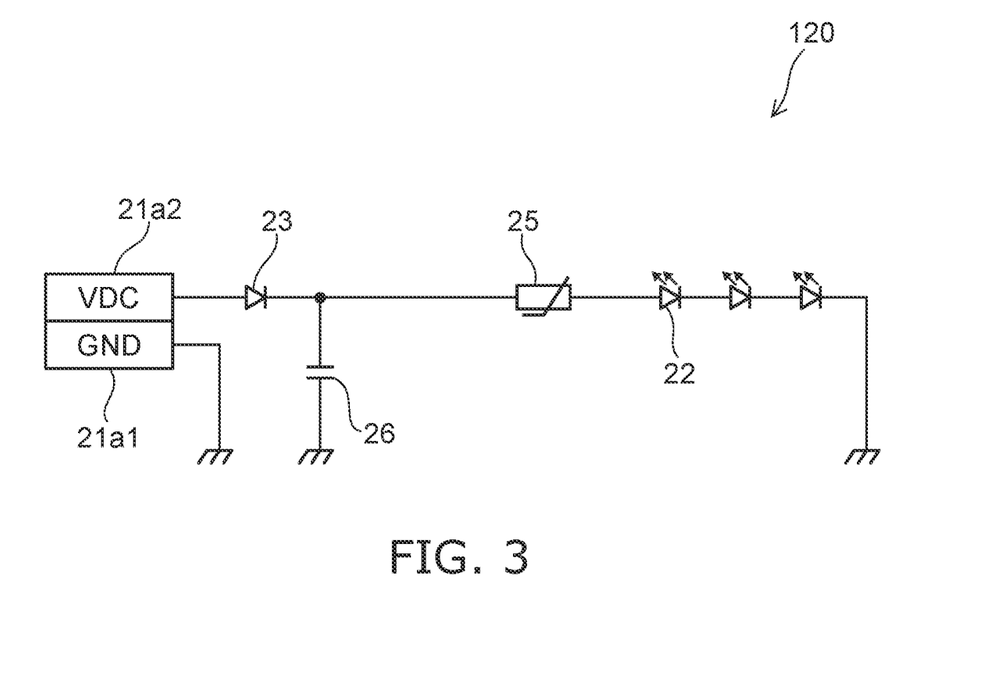
FIG. 3 is a circuit diagram of a light-emitting module according to a comparative example.

FIG. 3 is a circuit diagram of the light-emitting module 120 according to the comparative example.

Figure 4:
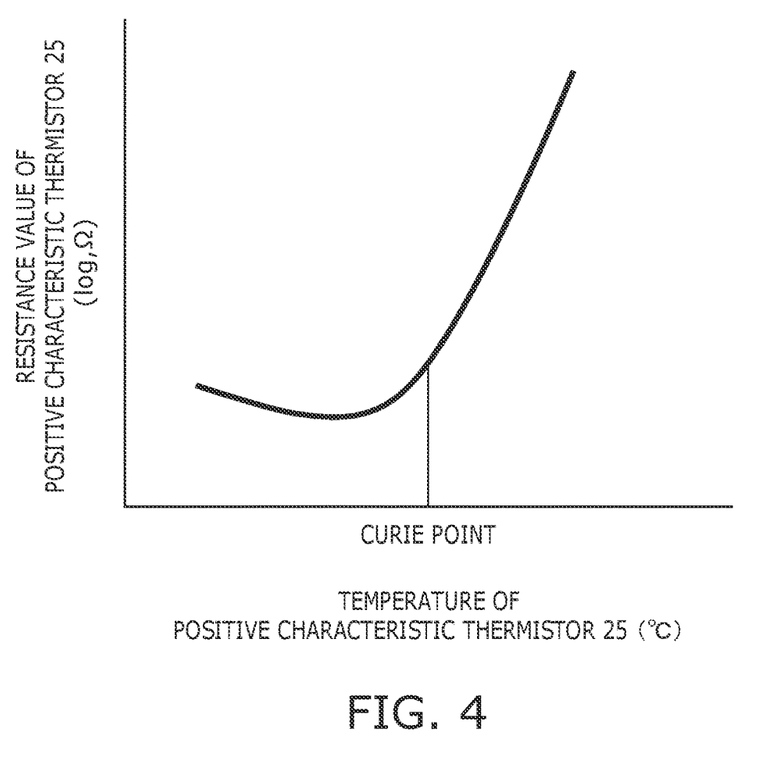
FIG. 4 is a graph showing resistance-temperature characteristics of a positive characteristic thermistor.

FIG. 4 is a graph showing resistance-temperature characteristics of the positive characteristic thermistor 25.

Figure 5:
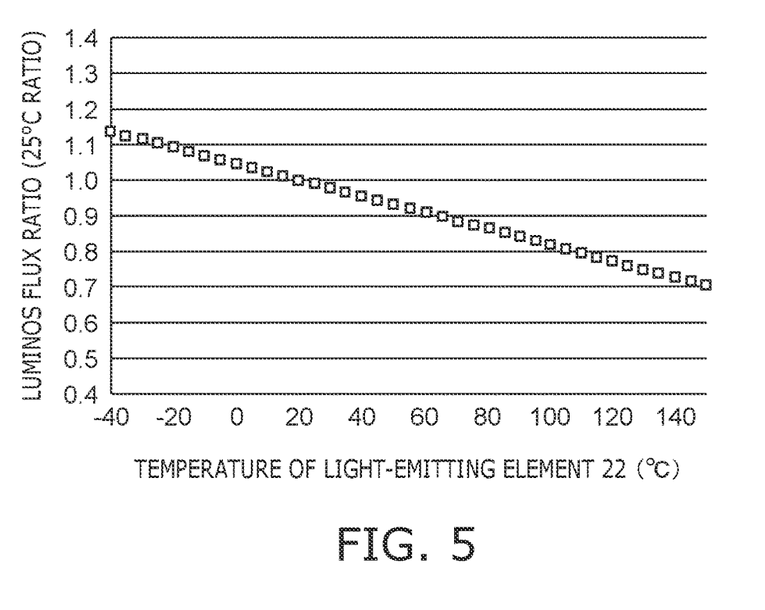
FIG. 5 is a graph showing temperature characteristics of a light-emitting element.

FIG. 5 is a graph showing temperature characteristics of the light-emitting element.

As illustrated in FIG. 3, the light-emitting element 22, the diode 23, the positive characteristic thermistor 25 and the capacitor 26 are provided in the light-emitting module 120 according to the comparative example. The negative characteristic thermistor 24 is not provided in the light-emitting module 120. The positive characteristic thermistor 25 is connected to the light-emitting element 22 in series.

When a current flows to the light-emitting element 22, light is emitted from the light-emitting element 22, but heat is also generated. A temperature of the light-emitting element 22 is raised due to the generated heat. When the temperature of the light-emitting element 22 exceeds the maximum junction temperature, there is a concern that a function of the light-emitting element 22 deteriorates, the light-emitting element 22 may be broken, or the operation lifespan of the light-emitting element 22 may be shortened.

Here, heat generated in the light-emitting element 22 is transferred to the positive characteristic thermistor 25 through the board 21 or the wiring pattern 21a, and thus a temperature of the positive characteristic thermistor 25 also rises. As shown in FIG. 4, when the temperature of the positive characteristic thermistor 25 exceeds the Curie point, a resistance value rapidly increases. The Curie point can be changed by a composition of a material of the positive characteristic thermistor 25. Accordingly, when using the positive characteristic thermistor 25 having the Curie point lower than the maximum junction temperature, the resistance of the positive characteristic thermistor 25 can be made to rapidly increase before the temperature of the light-emitting element 22 reaches the maximum junction temperature. When the resistance of the positive characteristic thermistor 25 increases, a current flowing to the light-emitting element decreases, and thus it is possible to suppress the temperature of the light-emitting element 22 from exceeding the maximum junction temperature.

By the way, the temperature characteristics also exist in the light-emitting element. For example, as shown in FIG. 5, when the temperature of the light-emitting element 22 rises, a luminous flux ratio (total luminous flux) of the light-emitting element 22 decreases. The temperature of the light-emitting element 22 becomes higher with the passage of time after lighting of the vehicle luminaire 1, and thus brightness gradually decreases. On the other hand, as can be seen from FIG. 4, at a temperature lower than the Curie point, the resistance value of the positive characteristic thermistor 25 is smaller, and a fluctuation is also smaller. Accordingly, at the temperature lower than the Curie point, an influence of a variation of the resistance value of the positive characteristic thermistor 25 on a variation of the total luminous flux of the light-emitting element 22 is small.

Accordingly, even though it is possible to suppress the temperature of the light-emitting element 22 from exceeding the maximum junction temperature, but the fluctuation in the total luminous flux in accordance with the temperature variation cannot be suppressed only with a configuration in which the positive characteristic thermistor 25 is connected to the light-emitting element 22 in series.

Figure 6:
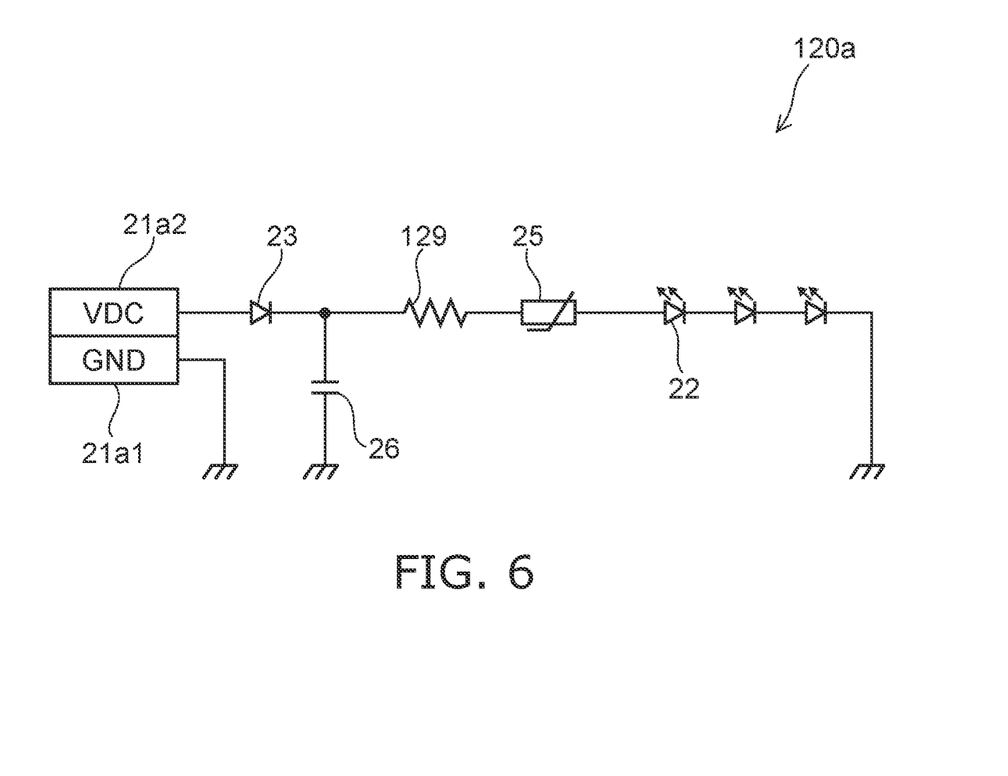
FIG. 6 is a circuit diagram of a light-emitting module according to another comparative example.

FIG. 6 is a circuit diagram of a light-emitting module 120a according to another comparative example.

Figure 7:
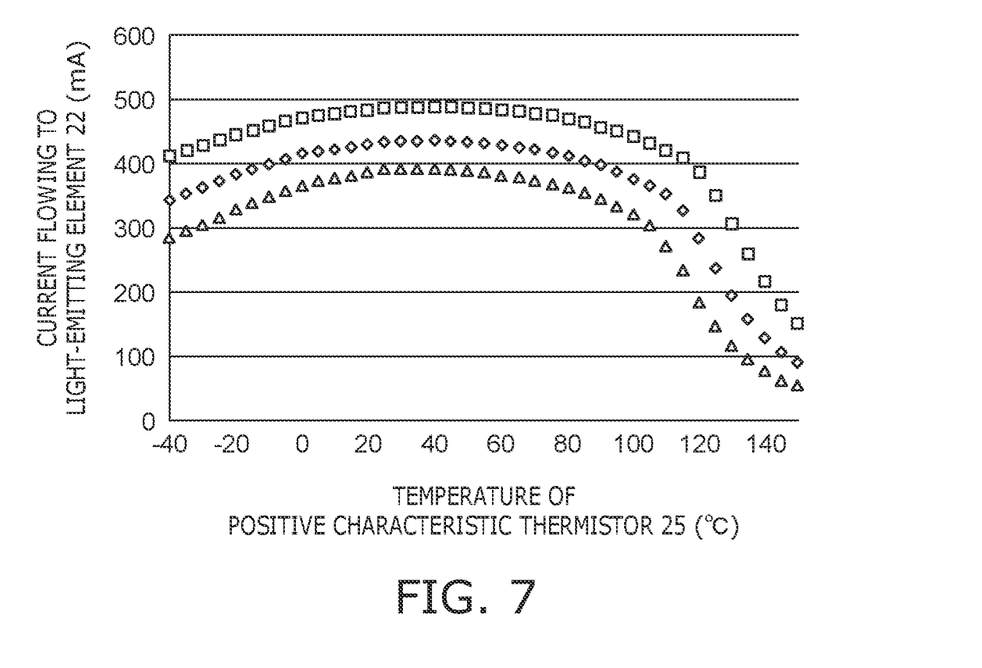
FIG. 7 is a graph showing an influence of a deviation in a resistance value of the positive characteristic thermistor.

FIG. 7 is a graph showing an influence of a deviation of a resistance value of the positive characteristic thermistor 25.

Figure 8:
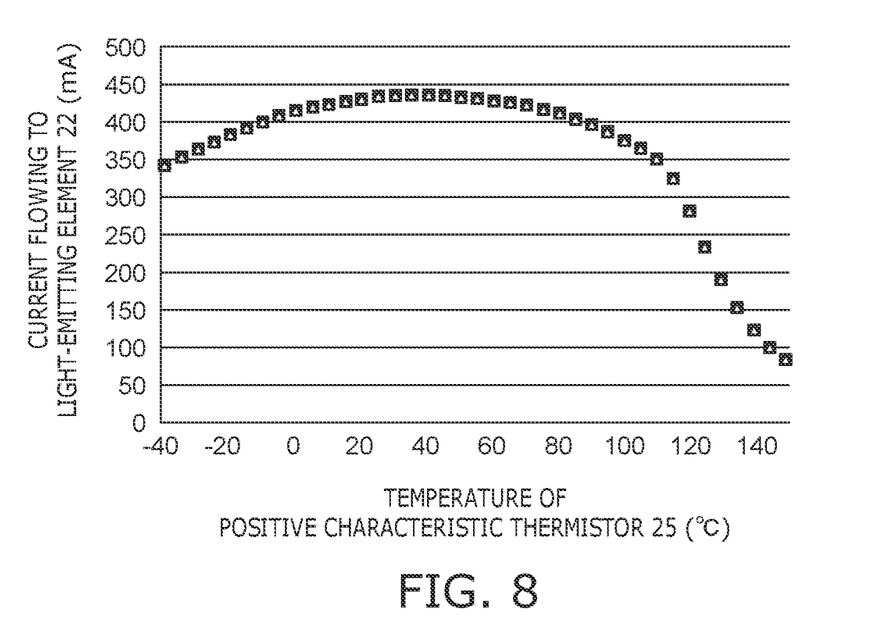
FIG. 8 is a graph showing an effect of changing a resistance value of a resistor.

FIG. 8 is a graph showing an effect of changing a resistance value of a resistor 29.

As illustrated in FIG. 6, the light-emitting element 22, the diode 23, the positive characteristic thermistor 25, the capacitor 26, and a resistor 129 are provided in the light-emitting module 120a according to the comparative example. The light-emitting module 120a corresponds to a case where the resistor 129 is further provided in the above-described light-emitting module 120.

Typically, a deviation of approximately ±20% exists in a resistance value of the positive characteristic thermistor 25. When the deviation of the resistance value of the positive characteristic thermistor 25 is large, as shown in FIG. 7, a current flowing to the light-emitting element 22 varies, and the total luminous flux of the light-emitting element 22 varies. In addition, there is a concern that the temperature of the light-emitting element 22 may exceed the maximum junction temperature.

Here, the resistor 129 that is connected to the positive characteristic thermistor 25 in series is provided in the light-emitting module 120a. When the resistor 129 is provided, the resistance value of the resistor 129 can be varied in correspondence with a resistance value of the positive characteristic thermistor 25, and thus it is possible to suppress a combined resistance value of the positive characteristic thermistor 25 and the resistor 129 from varying.

Accordingly, as shown in FIG. 8, it is possible to suppress a current flowing to the light-emitting element 22 from varying, and it is possible to suppress the total luminous flux of the light-emitting element 22 from varying. However, even though it is possible to suppress the total luminous flux of the light-emitting element 22 from varying by providing the resistor 129, a fluctuation in the total luminous flux in accordance with the above-described temperature variation cannot be suppressed. For example, when assuming that the vehicle luminaire 1 is turned on under an environment of 25° C., and the temperature of the light-emitting element 22 reaches about 90° C. with the passage of time, as shown in FIG. 8, the total luminous flux decreases by approximately 24%. The total luminous flux may decrease by approximately 30% depending on the temperature characteristics of the light-emitting element 22.

Here, as illustrated in FIG. 2, the negative characteristic thermistor 24 that is connected to the positive characteristic thermistor 25 in series is provided in the light-emitting module 20 according to this embodiment.

Figure 9:
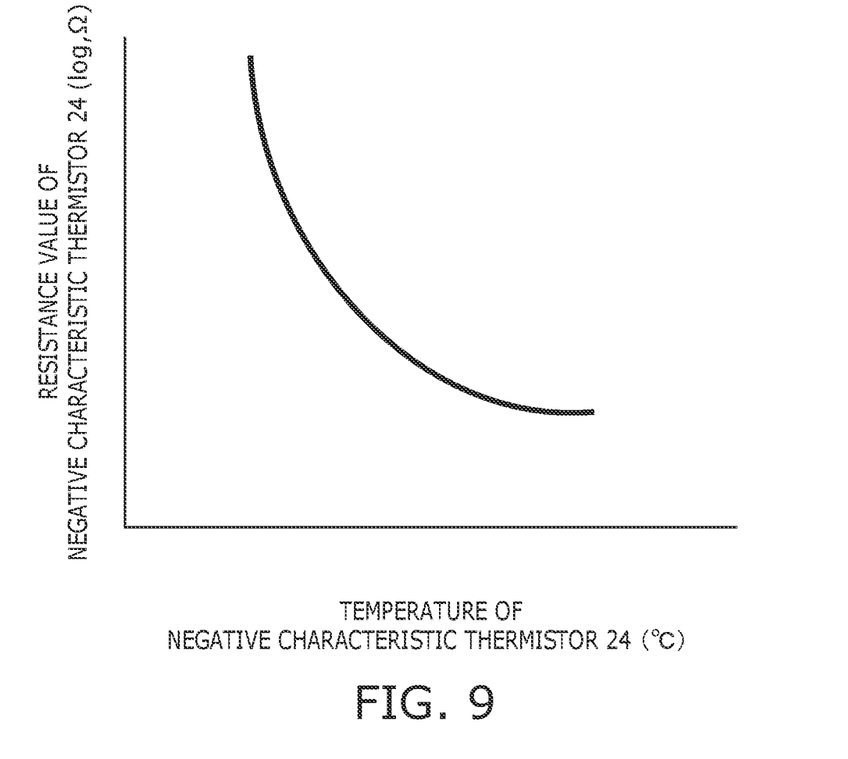
FIG. 9 is a graph showing resistance-temperature characteristics of a negative characteristic thermistor.

FIG. 9 is a graph showing resistance-temperature characteristics of the negative characteristic thermistor 24.

As shown in FIG. 9, in the negative characteristic thermistor 24, when a temperature rises, a resistance value gradually decreases. Accordingly, at a specific temperature, a current flowing to the light-emitting element 22 can be controlled by a combined resistance value of the negative characteristic thermistor 24 and the positive characteristic thermistor 25.

In this case, as shown in FIG. 4, at a temperature lower than the Curie point, the resistance value of the positive characteristic thermistor 25 is small, and a fluctuation is also small. Accordingly, at a temperature lower than the Curie point, the combined resistance value decreases in correspondence with a decrease in the resistance value of the negative characteristic thermistor 24. When the combined resistance value decreases, a current flowing to the light-emitting element 22 increases, and thus the total luminous flux of the light-emitting element 22 increases.

On the other hand, as shown in FIG. 5, temperature characteristics exist also in the light-emitting element. As described above, when the temperature of the light-emitting element 22 rises, the luminous flux ratio (total luminous flux) of the light-emitting element 22 decreases. Accordingly, when the negative characteristic thermistor 24 is provided, at a temperature lower than the Curie point, it is possible to supplement the total luminous flux decreased due to the temperature characteristics of the light-emitting element by increasing a current flowing to the light-emitting element 22. As a result, the fluctuation in the total luminous flux in accordance with the temperature variation can be suppressed.

When the temperature of the positive characteristic thermistor 25 exceeds the Curie point, the resistance value of the positive characteristic thermistor 25 rapidly increases. When the temperature is high, the resistance value of the negative characteristic thermistor 24 is small, and a fluctuation is also small. Accordingly, when the temperature becomes higher than the Curie point, the combined resistance value increases in correspondence with the increase in the resistance value of the positive characteristic thermistor 25. When the combined resistance value increases, a current flowing to the light-emitting element 22 decreases, and thus it is possible to suppress the temperature of the light-emitting element 22 from exceeding the maximum junction temperature.

That is, when using the vehicle luminaire 1 according to this embodiment, protection of the light-emitting element 22 can be realized, and the fluctuation in the total luminous flux in accordance with the temperature variation can be suppressed.

Figure 10:
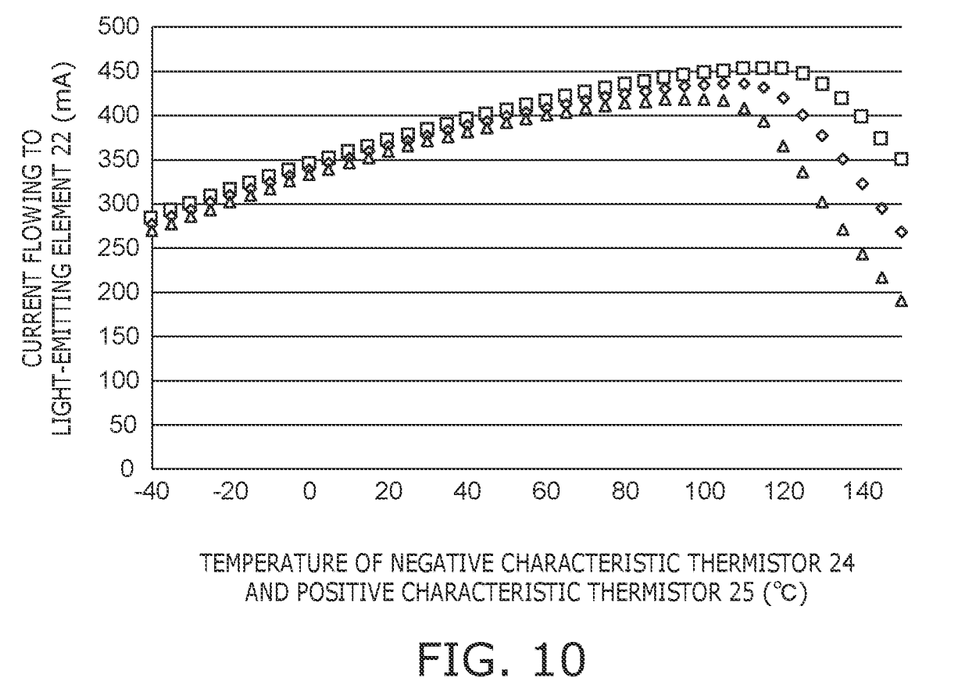
FIG. 10 is a graph showing temperature characteristics of light-emitting module according to the exemplary embodiment.

FIG. 10 is a graph showing temperature characteristics of the light-emitting module 20 according to this embodiment.

As can be seen from FIG. 10, at a temperature lower than the Curie point, a current flowing to the light-emitting element 22 increases in accordance with a decrease in the combined resistance value. Accordingly, as described above, it is possible to supplement a decrease in the total luminous flux due to the temperature characteristics of the light-emitting element by an increase in the total luminous flux due to an increase in the current flowing to the light-emitting element 22.

However, as described above, a deviation of approximately ±20% exists in a resistance value of the positive characteristic thermistor 25. In addition, the deviation of the resistance value of the negative characteristic thermistor 24 may be greater. Accordingly, the combined resistance value varies in correspondence with the deviation of the resistance value. When the combined resistance value varies, as shown in FIG. 10, a value of the current flowing to the light-emitting element 22 varies, and there is a concern that the total luminous flux may vary.

Accordingly, it is preferable that a predetermined allowable range is set in at least any one of the resistance value of the positive characteristic thermistor 25 and the resistance value of the negative characteristic thermistor 24. In this case, since the deviation of the combined resistance value can be reduced, the total luminous flux can be suppressed from varying.

However, in this case, it is necessary to select the positive characteristic thermistor 25 and the negative characteristic thermistor 24, this may lead to a decrease in productivity and an increase in the manufacturing cost.

Figure 11:
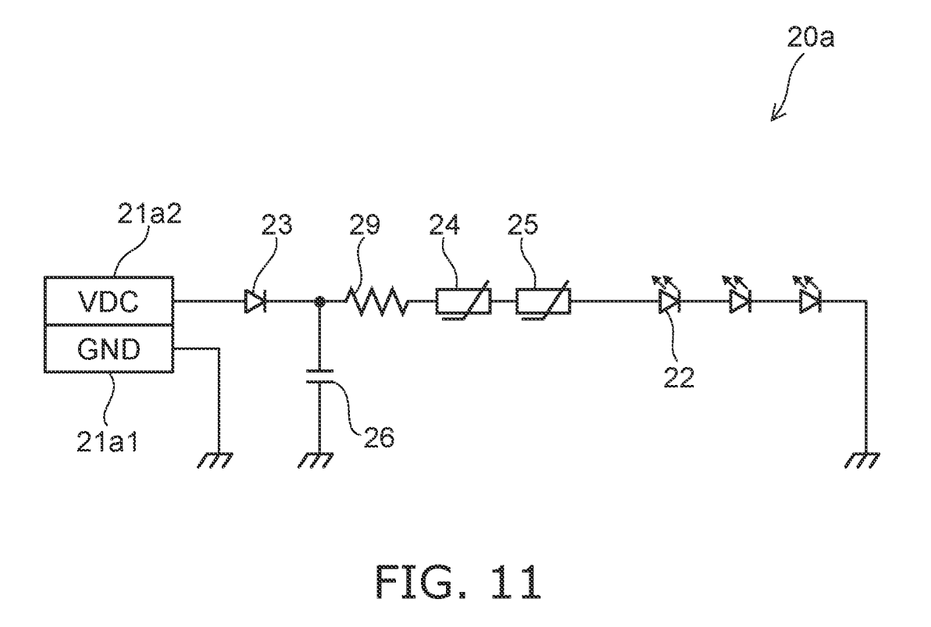
FIG. 11 is a circuit diagram of a light-emitting module according to another exemplary embodiment.

FIG. 11 is a circuit diagram of a light-emitting module 20a according to another embodiment.

As illustrated in FIG. 11, the light-emitting module 20a can include the light-emitting element 22, the diode 23, the negative characteristic thermistor 24, the positive characteristic thermistor 25, the capacitor 26, and the resistor 29. The light-emitting module 20a corresponds to a case where the resistor 29 is further provided in the above-described light-emitting module 20.

As described above, a deviation of the combined resistance value of the negative characteristic thermistor 24 and the positive characteristic thermistor 25 may increase. Accordingly, in the light-emitting module 20a, the resistor 29, the negative characteristic thermistor 24, and the positive characteristic thermistor 25 are connected in series. When the resistor 29 is provided, it is possible to suppress the combined resistance value of the resistor 29, the negative characteristic thermistor 24, and the positive characteristic thermistor 25 from varying by changing the resistance value of the resistor 29 in correspondence with the combined resistance value of the negative characteristic thermistor 24 and the positive characteristic thermistor 25.

For example, the resistor 29 can be set as a variable resistor. In addition, the resistor 29 can be set as a film-shaped resistor, and a resistance value may be changed by cutting out a part of the film-shaped resistor. In this case, when a part of the film-shaped resistor is cut out, the resistance value can be increased. For example, the film-shaped resistor may be set to contain ruthenium oxide or the like. When the film-shaped resistor is irradiated with a laser, a part of the resistor can be easily cut out. That is, the resistor 29 has a film shape, and may be provided with a slit 29a.

In addition, a resistor having an appropriate resistance value in correspondence with the combined resistance value of the negative characteristic thermistor 24 and the positive characteristic thermistor 25 may be selected. In this case, the resistor can be set as a surface mounting type resistor, or a resistor including a lead wire. However, it is preferable that the resistance value of the film-shaped resistor is set to be changed in consideration of an improvement of productivity or a reduction in the manufacturing cost.

Note that, for example, adjustment of the resistance value of the resistor 29 can be carried out on the basis of the combined resistance value of the negative characteristic thermistor 24 and the positive characteristic thermistor 25 at ordinary temperature (for example, 25° C.).

Figure 12:
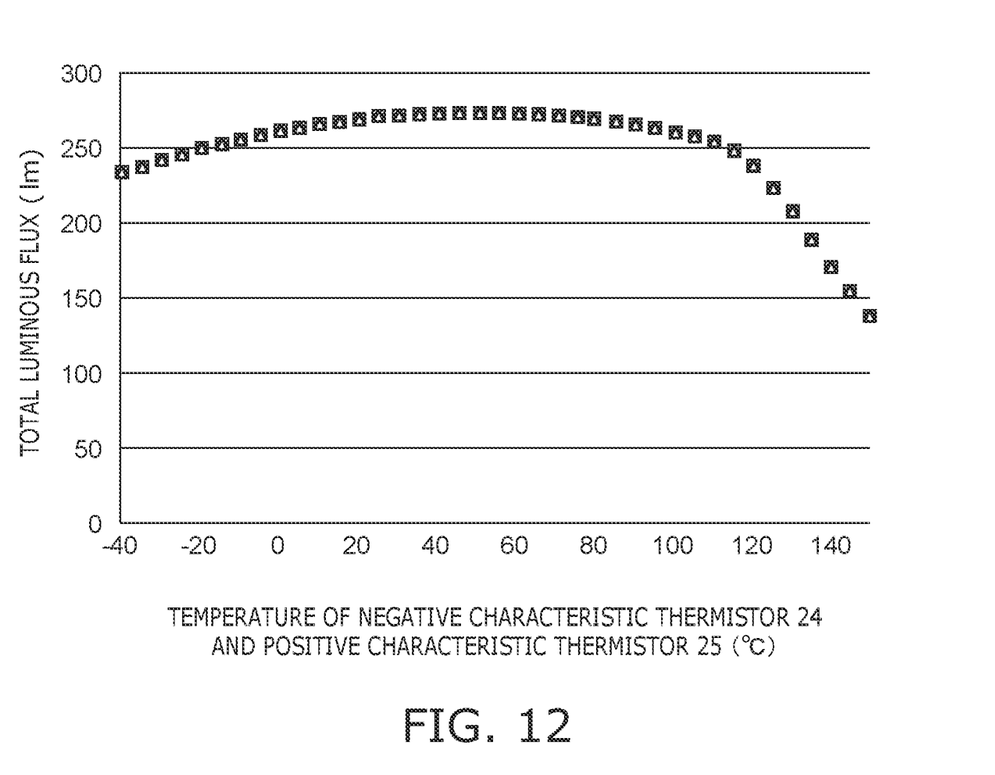
FIG. 12 is a graph showing an effect of changing a resistance value of a resistor.

FIG. 12 is a graph showing an effect of changing the resistance value of the resistor 29.

It is possible to suppress the combined resistance value of the resistor 29, the negative characteristic thermistor 24, and the positive characteristic thermistor 25 from varying by changing the resistance value of the resistor 29.

Accordingly, a current flowing to the light-emitting element 22 can be suppressed from varying, and as shown in FIG. 12, the total luminous flux of the light-emitting element 22 can be suppressed from varying.

(Vehicle Lighting Tool)

Next, the vehicle lighting tool 100 will be described.

Note that, in the following description, as an example, description will be given of a case where the vehicle lighting tool 100 is the front combination light that is provided in automobiles. However, the vehicle lighting tool 100 is not limited to the front combination light that is provided in automobiles. The vehicle lighting tool 100 may be a vehicle lighting tool that is provided in automobiles, railway vehicles, or the like.

Figure 13:
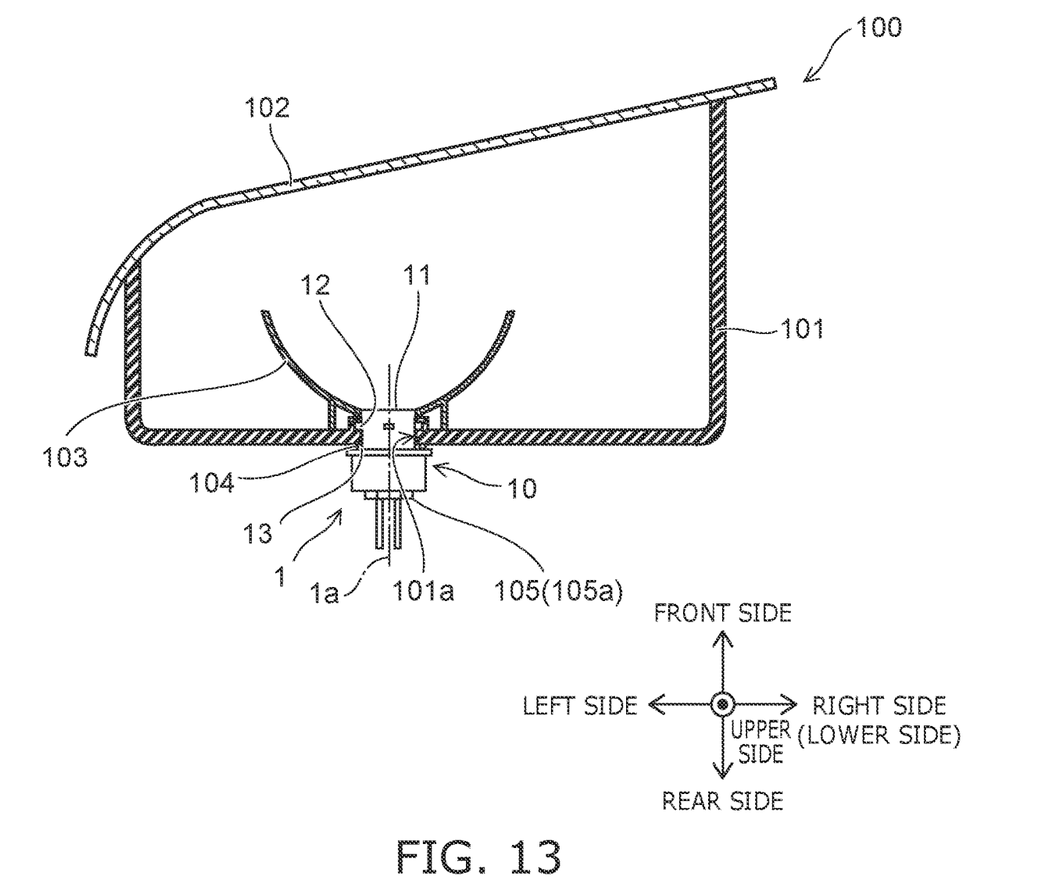
FIG. 13 is a schematic partial cross-sectional view illustrating a vehicle lighting tool.

FIG. 13 is a schematic partial cross-sectional view for illustrating the vehicle lighting tool 100.

As illustrated in FIG. 13, the vehicle luminaire 1, the housing 101, a cover 102, an optical element 103, a sealing member 104, and the connector 105 can be provided in the vehicle lighting tool 100.

The vehicle luminaire 1 can be mounted to the housing 101. The housing 101 can hold the mounting part 11. The housing 101 can be set to have a box shape in which one end side is opened. For example, the housing 101 can be formed from a resin or the like through which light is not transmitted. An attachment hole 101a, into which a portion of the mounting part 11 where the bayonet 12 is provided is inserted, can be provided in a bottom surface of the housing 101. A concave part, into which the bayonet 12 provided in the mounting part 11 is inserted, can be provided in a peripheral edge of the attachment hole 101a. Note that, description was given of a case where the attachment hole 101a is directly provided in the housing 101, but an attaching member including the attachment hole 101a may be provided in the housing 101.

When mounting the vehicle luminaire 1 to the vehicle lighting tool 100, the portion of the mounting part 11 where the bayonet 12 is provided is inserted into the attachment hole 101a, and the vehicle luminaire 1 is rotated. In this case, the bayonet 12 is held to the concave part provided in the peripheral edge of the attachment hole 101a. This attachment method is referred to as twist-lock.

The cover 102 can be provided to cover an opening of the housing 101. The cover 102 can be formed from a resin or the like having translucency. The cover 102 can be set to have a function of a lens or the like.

Light emitted from the vehicle luminaire 1 is incident to the optical element 103. The optical element 103 can carry out reflection, diffusion, guiding, condensing, formation of a predetermined luminous intensity distribution pattern, and the like with respect to the light emitted from the vehicle luminaire 1. For example, the optical element 103 illustrated in FIG. 13 is a reflector. In this case, the optical element 103 reflects the light emitted from the vehicle luminaire 1 to form a predetermined luminous intensity distribution pattern.

The sealing member 104 can be provided between the flange 13 and the housing 101. The sealing member 104 can have an annular shape. The sealing member 104 can be formed from a material such as a rubber and a silicone resin which have elasticity.

When the vehicle luminaire 1 is mounted to the vehicle lighting tool 100, the sealing member 104 is sandwiched between the flange 13 and the housing 101. Accordingly, an internal space of the housing 101 can be hermetically sealed by the sealing member 104. In addition, the bayonet 12 is pressed against the housing 101 due to an elastic force of the sealing member 104. Accordingly, the vehicle luminaire 1 can be suppressed from being detached from the housing 101.

The connector 105 can be fitted to the ends of the plurality of power-supply terminals 31 exposed to the inside of the hole 10b. A power-supply (not illustrated) or the like can be electrically connected to the connector 105. Accordingly, when the connector 105 is fitted to the ends of the plurality of power-supply terminals 31, the power-supply (not illustrated) or the like and the light-emitting element 22 can be electrically connected.

The sealing member 105a can be provided in the connector 105. When the connector 105 including the sealing member 105a is inserted into the hole 10b, the hole 10b is water-tightly sealed. The sealing member 105a has an annular shape, and can be formed from a material such as a rubber and a silicone resin which have elasticity.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions. Moreover, above-mentioned embodiments can be combined mutually and can be carried out.

What is claimed is:

1. A vehicle luminaire comprising:
a socket; and
a light-emitting module that is provided on one end side of the socket and includes at least one light-emitting element, a negative characteristic thermistor, a positive characteristic thermistor, a resistor, and a board,
the negative characteristic thermistor, the positive characteristic thermistor, and the resistor being connected in series, and the negative characteristic thermistor, the positive characteristic thermistor, and the resistor being connected in series with the light-emitting element,
a resistance value of the resistor being adjustable, the resistance value of the resistor being set so that a combined resistance value of the negative characteristic thermistor, the positive characteristic thermistor, and the resistor is within a predetermined range at ordinary temperature,
the light-emitting element, the negative characteristic thermistor, and the positive characteristic thermistor, and the resistor being provided on the board, and being thermally connected through the board.

2. The luminaire according to claim 1,
wherein the resistor has a film shape, and includes a slit.

3. The luminaire according to claim 2,
wherein the resistor contains a ruthenium oxide.

4. The luminaire according to claim 1,
wherein the board further includes a wiring pattern, and the light-emitting element, the negative characteristic thermistor, and the positive characteristic thermistor are further thermally connected through the wiring pattern.

5. The luminaire according to claim 1,
wherein the negative characteristic thermistor and the positive characteristic thermistor are provided in a vicinity of the light-emitting element.

6. The luminaire according to claim 1,
wherein the positive characteristic thermistor has a Curie point lower than a maximum junction temperature of the light-emitting element.

7. The luminaire according to claim 1,
wherein a current that flows to the light-emitting element is controlled by the combined resistance value of the negative characteristic thermistor, the positive characteristic thermistor, and the resistor.

8. The luminaire according to claim 7,
wherein at a temperature lower than a Curie point of the positive characteristic thermistor, the combined resistance value decreases in correspondence with a decrease in a resistance value of the negative characteristic thermistor.

9. The luminaire according to claim 8,
wherein the current that flows to the light-emitting element increases in correspondence with a decrease in the combined resistance value.

10. The luminaire according to claim 7,
wherein at a temperature higher than a Curie point of the positive characteristic thermistor, the combined resistance value increases in correspondence with an increase in a resistance value of the positive characteristic thermistor.

11. The luminaire according to claim 10,
wherein a temperature of the light-emitting element becomes equal to or lower than a maximum junction temperature due to an increase in the combined resistance value.

12. The luminaire according to claim 1,
wherein the socket contains a highly heat conductive resin.

13. The luminaire according to claim 1, further comprising:
a heat transfer part that is provided between the socket and the light-emitting module.

14. A vehicle lighting tool comprising:
the vehicle luminaire according to claim 1; and
a housing to which the vehicle luminaire is mounted.

15. The tool according to claim 14,
wherein when the vehicle luminaire is mounted to the housing, a central axis of the vehicle luminaire becomes approximately horizontal, and at least any one of the negative characteristic thermistor and the positive characteristic thermistor which are provided in the vehicle luminaire is located on an upper side in comparison to the central axis.

16. The tool according to claim 15,
wherein the light-emitting element provided in the vehicle luminaire is provided in a vicinity of the central axis.

* * * * *